(12) United States Patent
Bandin

(10) Patent No.: US 12,353,540 B2
(45) Date of Patent: Jul. 8, 2025

(54) AUTHORIZATION FOR THE LOADING OF AN APPLICATION ONTO A SECURITY ELEMENT

(71) Applicant: ORANGE, Issy les Moulineaux (FR)

(72) Inventor: Stéphane Bandin, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 120 days.

(21) Appl. No.: 17/422,964

(22) PCT Filed: Jan. 7, 2020

(86) PCT No.: PCT/FR2020/050017
§ 371 (c)(1),
(2) Date: Jul. 14, 2021

(87) PCT Pub. No.: WO2020/148492
PCT Pub. Date: Jul. 23, 2020

(65) Prior Publication Data
US 2022/0027455 A1    Jan. 27, 2022

(30) Foreign Application Priority Data

Jan. 14, 2019  (FR) ..................................... 1900300

(51) Int. Cl.
*G06F 21/00*  (2013.01)
*G06F 21/51*  (2013.01)

(52) U.S. Cl.
CPC ........ *G06F 21/51* (2013.01); *G06F 2221/033* (2013.01)

(58) Field of Classification Search
CPC ..... G06F 21/51; G06F 2221/033; G06F 21/57
See application file for complete search history.

(56) References Cited

U.S. PATENT DOCUMENTS

| | | | |
|---|---|---|---|
| 6,317,832 B1* | 11/2001 | Everett | .................. G06F 21/77 |
| | | | 713/172 |
| 2002/0040936 A1* | 4/2002 | Wentker | ............... G06Q 20/341 |
| | | | 235/492 |

(Continued)

FOREIGN PATENT DOCUMENTS

| CN | 1886747 A | 12/2006 |
|---|---|---|
| CN | 106815518 A | 6/2017 |

(Continued)

OTHER PUBLICATIONS

English translation of the Written Opinion of the International Searching Authority dated Mar. 13, 2020 for corresponding International Application No. PCT/FR2020/050017, filed Jan. 7, 2020.

(Continued)

*Primary Examiner* — Ghazal B Shehni
(74) *Attorney, Agent, or Firm* — David D. Brush; Westman, Champlin & Koehler, P.A.

(57) ABSTRACT

A method and device for authorizing the loading of an application onto a security element that can communicate with a loading server of an application provider. The method is implemented by the security element and includes the following steps: obtaining at least one type of authorized application; obtaining the type of application to be loaded; comparing the type of application to be loaded and the type of authorized application; depending on the results of the comparison, authorizing the loading of the application.

17 Claims, 2 Drawing Sheets

(56) References Cited

U.S. PATENT DOCUMENTS

Figure 1:
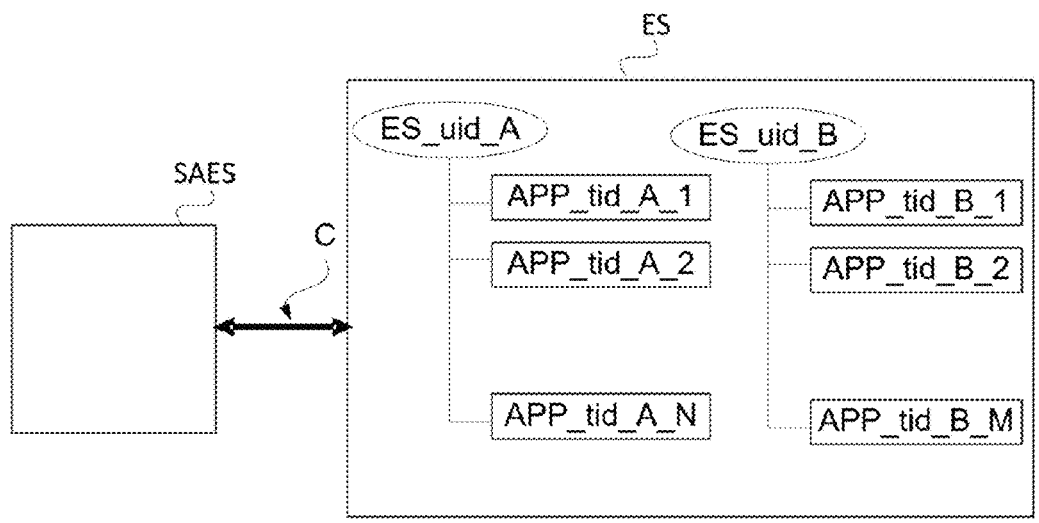

| | | | |
|---|---|---|---|
| 2005/0125661 A1 | 6/2005 | Vaidyanathan | |
| 2008/0271144 A1* | 10/2008 | Bleumer | G06F 21/445 726/22 |
| 2009/0165132 A1* | 6/2009 | Jain | G06F 21/554 726/22 |
| 2016/0337370 A1* | 11/2016 | Lipscomb | G06Q 20/356 |
| 2017/0068810 A1* | 3/2017 | Yao | G06F 21/44 |

FOREIGN PATENT DOCUMENTS

| | | | |
|---|---|---|---|
| CN | 107944261 A | 4/2018 | |
| CN | 107944262 A | 4/2018 | |
| JP | 2001312402 A | 11/2001 | |

OTHER PUBLICATIONS

International Search Report dated Mar. 4, 2020 for corresponding International Application No. PCT/FR2020/050017, Jan. 7, 2020.
Written Opinion of the International Searching Authority dated Mar. 4, 2020 for corresponding International Application No. PCT/FR2020/050017, filed Jan. 7, 2020.
Klaus Vedder, "SIM evolution", (20th SIGOS Conference for Telco & Digital Experience—Jul. 9-11, 2018, Nuremberg.
ETSI Standard TS 103 666-2, "Smart Secure Platform (SSP); Integrated SSP (iSSP) characteristics", Jan. 14, 2019.
English translation and Chinese Office Action dated Sep. 11, 2024, for corresponding Chinese Application No. 202080017334.3.
English translation and copy of the Chinese Office Action dated Apr. 22, 2025, for Chinese Application No. 202080017334.3.

\* cited by examiner

AUTHORIZATION FOR THE LOADING OF AN APPLICATION ONTO A SECURITY ELEMENT

CROSS-REFERENCE TO RELATED APPLICATIONS

This Application is a Section 371 National Stage Application of International Application No. PCT/FR2020/050017, filed Jan. 7, 2020, which is incorporated by reference in its entirety and published as WO 2020/148492 A1 on Jul. 23, 2020, not in English.

1. FIELD OF THE INVENTION

The invention relates to a security element. It applies in particular to a security element able to download applications from a communications network.

2. PRIOR ART

The transfer of data between a remote machine and a security element, such as for example a chip card, is more often than not secured by cryptographic mechanisms. These mechanisms, be they symmetrical or asymmetrical, make it possible to guarantee the confidentiality and integrity of the exchanged data, thus creating a secure communication channel between the remote machine and the security element.

The establishment of a secure communication channel, which also makes it possible to identify the transmitter of the data, is deemed to be sufficient proof of trust between the two parties; the recipient therefore does not check the nature of the data before accepting receipt thereof.

As a result, the transmitter is able to use the secure communication channel to send data, in particular applications, that may be improper.

3. DISCLOSURE OF THE INVENTION

The invention aims to improve the prior art.

To this end, it proposes a method for authorizing the loading of an application onto a security element able to communicate with a loading server of an application provider, the method being implemented by the security element and comprising the following steps:
  obtaining at least one type of authorized application;
  obtaining the type of the application to be loaded;
  comparing the type of the application to be loaded and the type of authorized application;
  depending on the results of the comparison, authorizing the loading of the application.

Advantageously, according to the invention, an application is loaded onto the security element only if verification information has allowed it to be validated. Since the verification information depends on the type of the application to be loaded, a provider, even a reliable one, is not able to load an unwanted application onto the security element.

An "application" is understood here to mean a set of data (active data, such as computer codes, or passive data, such as data of any kind, including cryptographic keys) intended to be used subsequently on the security element. The application is associated with a "type", which corresponds for example to a category of applications (telecommunications, identity, digital rights, connected objects, payment, etc.). The application may in particular take the form of a computer program and of associated data; the computer program may comprise operating system elements.

A "security element" is understood to mean any hardware and/or software element that ensures data security in accordance with the rules and security requirements set by a trusted authority, for example a chip card, a SIM (for Subscriber Identity Module) card or any of their evolutions: eSIM (embedded SIM), UICC (for Universal Integrated Circuit Card), eUICC (for embedded UICC) or an SSP (for Smart Secure Platform) architecture currently being defined at ETSI. Reference may be made for example to the document "SIM evolution" by Mr. Klaus Vedder (20TH SIGOS CONFERENCE FOR TELCO & DIGITAL EXPERIENCE—9-11 Jul. 2018|Nuremberg) for a presentation of this architecture. According to another example, the architecture of the security element may be a TEE (for Trusted Execution Environment) architecture, that is to say a secure (memory) area isolated from other execution environments, located in a device (such as a mobile telephone), guaranteeing that sensitive data are stored, processed and protected in a trusted environment.

An "application provider" is understood to mean an entity that makes one or more applications available to the security element, such as for example a mobile network operator (also called MNO), a representative of a state providing identity applications, a bank providing payment applications, etc. The application provider is identified uniquely by an identifier, such as for example a URI (for Universal Resource Identifier), a character string, a sequence of numbers, etc.

According to one particular mode of implementation of the invention, a method as described above is furthermore characterized in that the security element is accessible to at least one user identified by a user identifier, the type of authorized application relates to said user and the method comprises a step of obtaining said user identifier.

This mode of implementation of the invention makes it possible to control the loading of the applications for a given user, when the security element is associated with one or more users who have rights regarding this element, in particular the right to use the resources of this security element for a given application or service. They are provided with a user identifier, such as for example a name, a number, a character string, a URI, etc. Since the type of authorized application relates to a specific user, it is thus ensured that each user is able to benefit securely from the loading of his own applications.

According to one particular mode of implementation of the invention, a method as described above is furthermore characterized in that it comprises a step of obtaining an identifier of the provider of the application to be loaded and in that the verification information is calculated on the basis of said identifier of the provider.

This mode of implementation of the invention makes it possible in particular to strengthen the validation of the loading by introducing an identifier of the provider into the calculation of the item of validation data, which makes it possible to rule out unauthorized providers. Advantageously, if the validation information is established by combining the identifier of the provider and the type of authorized application, it is possible to decline loading of an application whose type is not authorized for a given provider, and possibly for a given user.

According to one particular mode of implementation of the invention, a method as described above is characterized in that it furthermore comprises:
  a step of comparing the identifier of the provider of the application to be loaded and the identifier of the user;

depending on the results of the comparison, a step of declining the loading of the application.

This mode of implementation of the invention makes it possible to strengthen the security of the verification by comparing the identifier of the provider with that of the user of the security element. Thus, for example, if the two entities are "bank" entities, the loading could be accepted, but if one of the entities is not a bank, this will result in loading of the application being declined.

According to another particular embodiment of the invention, the authorization method is furthermore characterized in that an identifier of said user and at least one type of application authorized for said user are recorded in the form of a certificate in a memory of the security element.

Advantageously according to this embodiment, an electronic certificate may be used to transmit the data to the security element. Such a certificate, used to identify and authenticate a person, but also to encrypt exchanges, may correspond to a standard that is well known to those skilled in the art (such as the X509 standard, for example).

The invention also relates to a device for authorizing the loading of an application onto a security element able to communicate with a loading server of an application provider, the device comprising:

an obtainment module for obtaining at least one type of authorized application;

an obtainment module for obtaining the type of the application to be loaded;

a comparison module for comparing the type of the application to be loaded and the type of authorized application;

an authorization module for authorizing the loading of the application depending on the results of the comparison.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to an electronic card comprising such an authorization device.

The invention also relates to a secure memory area comprising such an authorization device.

The invention also relates to a computer program comprising instructions for implementing the above method according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This authorization device and this computer program have features and advantages that are analogous to those described above in relation to the authorization method. The optional features mentioned for the method may be applied to the device and to the program.

4. LIST OF THE FIGURES

Figure 2:
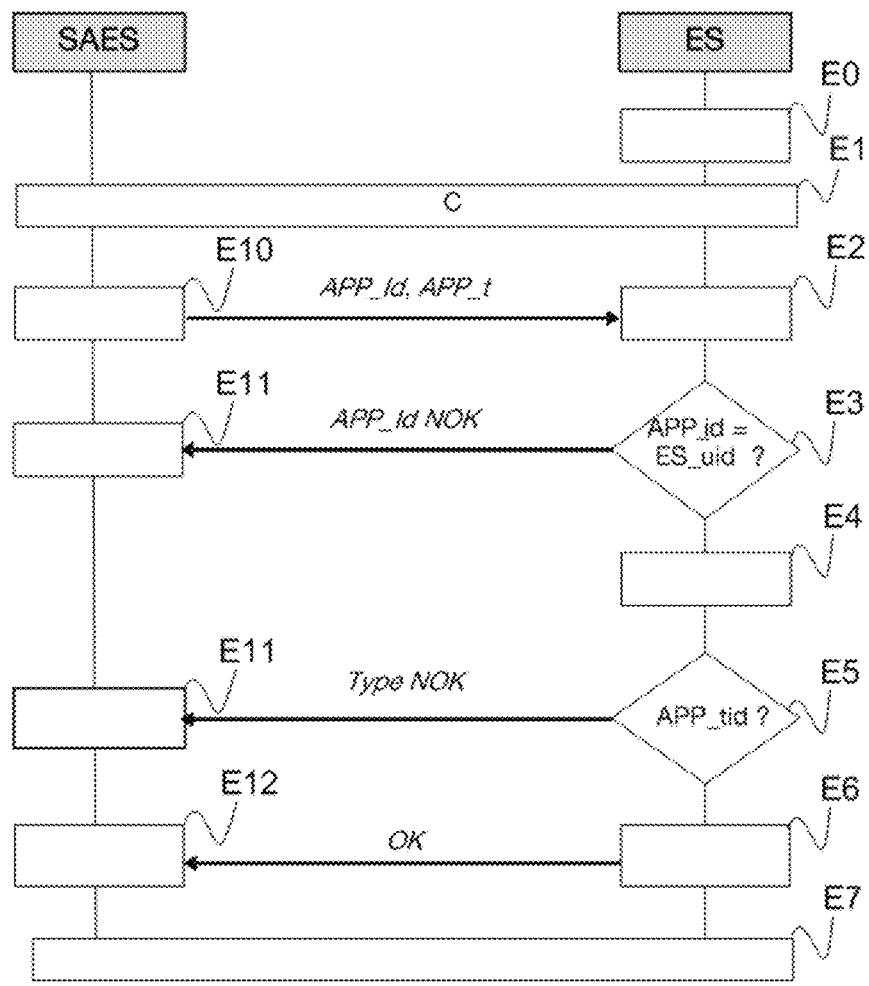
Figure 3:
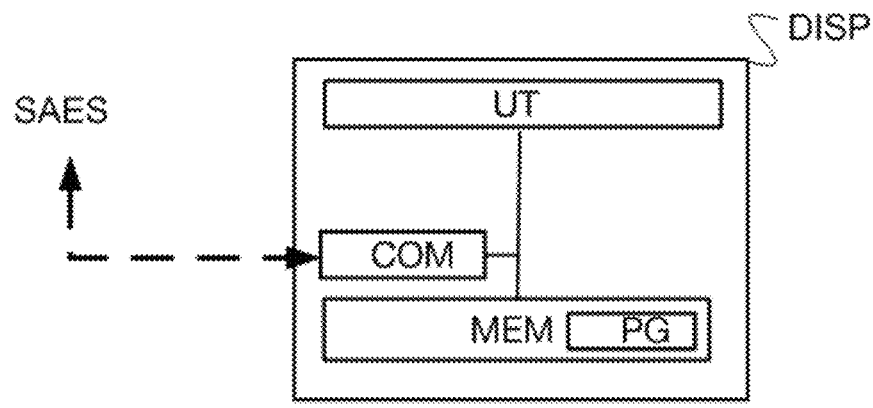
Figure 4:
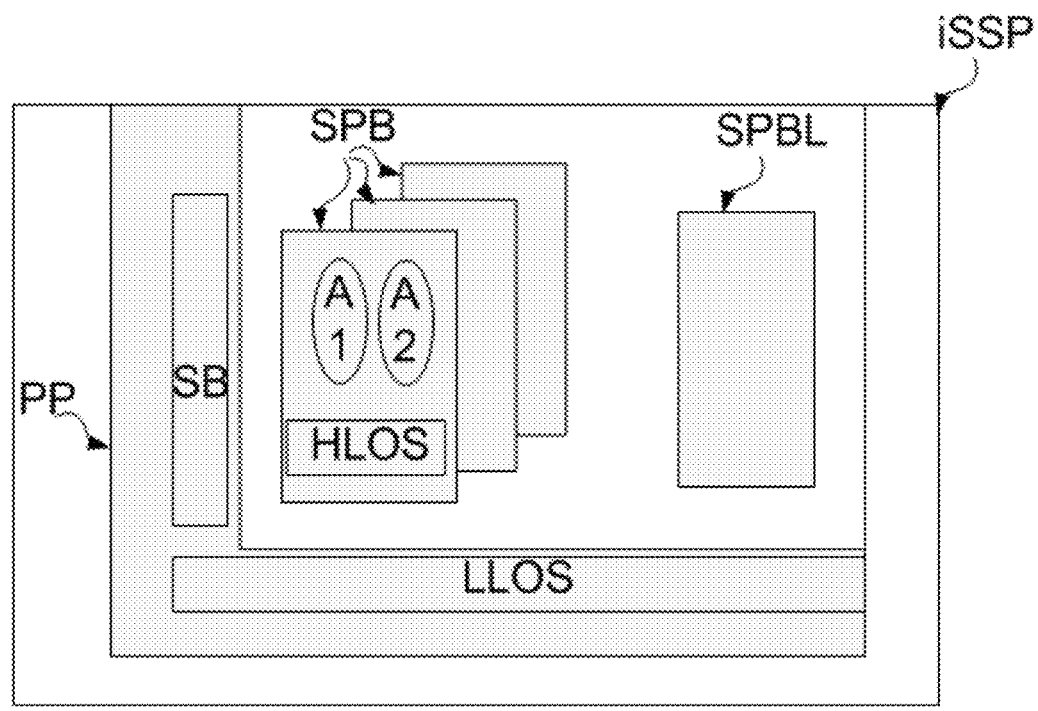

Other features and advantages of the invention will become more clearly apparent upon reading the following description of particular embodiments, provided by way of simple illustrative and nonlimiting examples, and the appended drawings, in which:

FIG. 1 illustrates an example of an environment for implementing the invention, according to one particular embodiment of the invention, FIG. 2 illustrates steps of the method for authorizing loading of an application, according to one particular embodiment of the invention, FIG. 3 illustrates a device configured so as to implement the loading authorization method, according to one particular embodiment of the invention, FIG. 4 illustrates a device configured so as to implement the loading authorization method, according to another particular embodiment of the invention.

5. DESCRIPTION OF ONE EMBODIMENT OF THE INVENTION

5.1 General Principle of the Invention

The method described here proposes a method for verifying the nature of the data constituting an application within a security element (ES) before accepting receipt thereof. Each user of the security element must be registered beforehand via an identifier, as well as the list of the types of application for which this user authorizes downloading, in a memory of the ES. Before downloading, the type of the application is verified by the security element. Advantageously, a transmitter/provider is therefore no longer able to use the communication channel, even though it is secure, to send improper data.

5.2 Particular Embodiments of the Invention

FIG. 1 illustrates one example of an environment for implementing the invention, according to one particular embodiment, in the context of downloading an application (APP) from a remote machine, or an application server for a security element (SAES), to a security element (ES).

According to this embodiment, the security element ES has at least one user provided with an identifier, denoted ES_uid. This user defines the one or more types of application for which he authorizes downloading onto the ES. There may be a plurality of users of one and the same ES, as shown in FIG. 1, where the ES has two users A and B (ES_uid_A and ES_uid_B). The security element may be integrated for example into a device such as a smartphone. It may be in the form of hardware, or software, or a combination of both.

The application server communicates with the security element (ES) so as to download an application (APP) through the communication channel C.

According to one particular embodiment of the invention, the communication channel C is secure, for example by virtue of the use of cryptographic keys.

The application (APP) to be downloaded is associated with a provider and has a type; APP_id denotes the identifier of the application provider and APP_t denotes the type of the application. APP_t may be used by one or more providers.

APP_tid denotes the identifier representing the type of application APP_t offered by the provider APP_id; for example, if APP is the loyalty app of the merchant xyz, APP_id (id=xyz) is the identifier of this merchant, APP_t corresponds to the type "loyalty applications" and APP_tid_A is the type "loyalty applications" of the merchant xyz for the client A.

According to one particular embodiment of the invention, the value APP_tid is formed by combining the value of APP_id and of APP_t.

According to one particular embodiment of the invention: the application APP is an electronic identity application; a type of application APP_t is a type of identity application (passport, driving license, etc.); a provider is a state or a representative of a state (ANSSI in France or the BSI in Germany) represented in the ES by an ES_uid; multiple states may agree to use the same values of APP_t, not depending on the APP_id of the provider (a Franco-German citizen may have a passport for each of the two countries). Implementing the invention in this context makes it possible to guarantee that only the French state is able to download the French identity applications, and is not able to download the identity applications of another state.

FIG. 2 illustrates steps of the method for loading an application, according to one particular embodiment of the invention.

Step E0 corresponds to an initialization step. This may be performed at any time (initialization of the card, or subsequent personalization by the user, etc.). For each user of the ES, the following information is stored in the memory of the ES:

A unique identifier ES_uid of the user. According to one particular embodiment, the value of ES_uid is equal to the value of APP_id;

The list of APP_tid, that is to say the list of the types of application for which downloading is authorized by the user.

According to one particular embodiment, this information is stored in an electronic certificate (Cert), comprising for example the following information:

The identifier of the issuer of the certificate (for example: urn:xyz.com). This identifier then acts as ES_uid.

The list of APP_tid, that is to say the list of the types of application for which downloading is authorized by the user of the ES for a given provider.

In a step E1, the server and the security element, SAES and ES, establish a communication channel C.

According to one particular embodiment of the invention, this communication channel is secure by virtue of the use of public-key electronic certificates, as presented above.

In a step E10, the server SAES sends, on the communication channel C, the identifier of the provider (APP_id) and the type of application (APP_t) of an application APP to be downloaded, received in a step E2.

In an optional step E3, the security element ES verifies that the provider of this application is actually authorized. According to one embodiment, it compares the received value of APP_d with the recorded values of ES_uid:

If the value of APP_id does not match any recorded value of ES_uid, ES responds to SAES that APP_id is not linked to any user registered for this ES; ES does not accept downloading of APP. This is to prevent an application provider from using the security element improperly. For example, if the ES_uid has the value lambda (for example telco for a telecommunications operator) but the App_id is associated with a bank, this step fails because the user lambda (telco) is not able to load a banking application.

If the value of APP_id matches a recorded value of ES_uid, the processing continues.

According to one particular embodiment of the invention presented above, according to which the communication channel is secure by virtue of the use of public-key electronic certificates, the identifier of the issuer of the certificate (ES_uid) is extracted from the certificate.

Next, in a step E4, the security element ES obtains validation information, denoted APP'_tid, from the type of application APP_t or, according to one preferred embodiment, by combining the information sent by the server SAES, APP_id and APP_t.

According to one particular embodiment of the invention, APP_tid is calculated in accordance with the method described in the IETF RFC 4122 specification: "A Universally Unique IDentifier (UUID) URN Namespace"; such an identifier is also known by the name "UUID version 5", where NID (Namespace Identifier) is equal to APP_id and NSS (Namespace Specific String) is equal to APP_t.

According to another particular embodiment of the invention, this processing may be entrusted to an external entity by the security element.

In a step E5, the security element ES compares the value of APP'_tid, calculated or obtained in the previous step, with the values of APP_tid recorded for the user ES_uid; if the value of APP'_tid does not match any value of APP_tid recorded for the user ES_uid, ES responds to the server SAES that the type of application is not authorized by the user; ES does not accept downloading of the application APP.

In a step E6, if the value of APP'_tid matches a value of APP_tid recorded for the user ES_uid, ES indicates to SAES that downloading of APP is authorized.

According to one particular embodiment of the invention presented above, according to which the communication channel is secure by virtue of the use of public-key electronic certificates, this step consists in comparing the value of APP'_tid calculated in step E4 with the values of APP_tid extracted from the certificate used to establish the communication channel, that is to say the list of types of application for which downloading is authorized by the user of the ES.

In a step E11, the server SAES downloads the application APP onto the security element ES, which receives it in a step E7.

FIG. 3 illustrates a device DISP configured so as to implement the loading method, according to one particular embodiment of the invention.

The device DISP has the conventional architecture of a security element, and comprises in particular a memory MEM, a processing unit UT, equipped for example with a processor PROC, and driven by the computer program PG stored in memory MEM. The computer program PG comprises instructions for implementing the steps of the loading method such as described above when the program is executed by the processor PROC.

On initialization, the code instructions of the computer program PG are for example loaded into the memory, before being executed by the processor PROC. The processor PROC of the processing unit UT in particular implements the steps of the loading authorization method according to any one of the particular embodiments described with reference to FIG. 2 according to the instructions of the computer program PG.

The device DISP comprises a communication module COM configured so as to establish communications with a network, for example an IP network, in order to download the application APP. The application APP is loaded into part of the memory M.

According to one particular embodiment, such a device is a SIM card.

According to one particular embodiment, such a device is a TEE (for Trusted Execution Environment), as mentioned above.

According to another particular embodiment, shown in FIG. 4, such a device is a secure platform such as an iSSP (for integrated Smart Secure Platform) as defined in particular in the standard currently being developed by the ETSI organization, reference TS 103 666-2, entitled: "Smart Secure Platform (SSP); Integrated SSP (iSSP) characteristics". This evolution of secure elements meets new functional and security requirements of the security element (SE) that allow, inter alia, multi-application management, optimization of software and hardware architectures, reduction of integration costs and increased secure storage capacities, etc.

The hardware and software architecture of an iSSP, as shown in FIG. 4, is divided into three parts: a primary platform (PP) formed by the hardware itself (processors, memories, etc.) and also a low-level operating system (LLOS) and basic services (SB), for example communication basic services; secondary platforms (Secondary Platform Bundles—SPB) formed by a high-level operating system (HLOS) and a family of applications denoted A1, A2, etc. (for example: relating to the USIM, the identity, etc. of the user); a loading module (Secondary Platform Bundle Loader—SPBL), specific SPB for managing the other SPBs (loading, activation, etc.). In this context, the invention applies to the "Secondary Platform Bundle" (SPB) application download mechanism: the method for authorizing the loading of an application, as described above, is implemented by the hardware and software elements of the iSSP such that a family or a set of applications (SPB) is able to be loaded into the memory of the iSSP by the loader (SPBL) after verification of its type, and possibly of its provider, for a given user.

According to one embodiment, the iSSP contains a certificate from a certification authority (for example the GSMA, an international association of mobile telephony operators) that contains the types of application family (SPB) authorized to be downloaded; for example Telecom SPB, Payment SPB, Identity SPB, etc. It should be noted that multiple authorities (GSMA, bank, nation-state, etc.), multiple users, and multiple application families may coexist in the iSSP.

It goes without saying that the embodiment that has been described above has been given purely by way of wholly nonlimiting indication, and that numerous modifications may easily be made by those skilled in the art without, however, departing from the scope of the invention.

The invention claimed is:

1. A method implemented by a security element able to communicate with an application loading server and comprising:
    storing a list of at least one category of authorized application in association with the secure element, wherein at least one of the at least one category of authorized application is identified by a category identifier that is used by more than one application provider; and
    authorizing loading of an application onto said security element on the basis of a match between a category of said application to be loaded and at least one category in the stored list.

2. The method as claimed in claim 1, wherein the security element is accessible via a user identifier, the list of at least one category of authorized application relating to said user identifier, and the method comprises obtaining said user identifier.

3. The method as claimed in claim 2, wherein the user identifier and the list of at least one category of application, which is authorized for said user identifier, are recorded in the form of a certificate in a memory of the security element.

4. The method as claimed in claim 1, wherein said method comprises obtaining an identifier of a provider of the application to be loaded, and said authorization takes into account said identifier of the provider.

5. The method as claimed in claim 4, wherein said method furthermore comprises:
    declining the loading of the application on the basis of said identifier of the provider of the application to be loaded and of a user identifier of said secure element.

6. The method of claim 1 comprising receiving said at least one category of authorized application during a personalization of the card subsequent to an initialization of the card.

7. A first device for authorizing loading of an application onto a security element able to communicate with a loading server of an application provider, the first device comprising:
    at least one processor configured to:
    store a list of at least one category of authorized application in association with the secure element, wherein at least one of the at least one category of authorized application is identified by a category identifier that is used by more than one application provider; and
    authorize loading of an application onto said security element on the basis of a match between a category of said application to be loaded and at least one category in the stored list.

8. The first device as claimed in claim 7, wherein the security element is accessible via a user identifier, the list of at least one category of authorized application relating to said user identifier, and said processor is designed to obtain said user identifier.

9. The first device as claimed in claim 8, wherein the user identifier and the list of at least one category of application, which is authorized for said user identifier, are recorded in the form of a certificate in a memory of the security element.

10. The first device as claimed in claim 7, wherein said processor is designed to obtain an identifier of a provider of the application to be loaded and wherein said authorization takes into account said identifier of the provider.

11. The first device as claimed in claim 10, said processor being designed to decline loading of the application on the basis of said identifier of the provider of the application to be loaded and of a user identifier of said security element.

12. A second device comprising the first device as claimed in claim 7 and a secure memory area, the first device being comprised in said secure memory area of the second device.

13. An electronic card comprising:
a first device for authorizing loading of an application onto a security element able to communicate with a loading server of an application provider, the first device comprising at least one processor configured to:
store a list of at least one category of authorized application in association with the secure element, wherein at least one of the at least one category of authorized application is identified by a category identifier that is used by more than one application provider; and
authorize loading of an application onto said security element on the basis of a match between a category of said application to be loaded and at least one category in the stored list.

14. The electronic card as claimed in claim 13, wherein the security element is accessible via a user identifier, the list of at least one category of authorized application relating to said user identifier, and said processor is designed to obtain said user identifier.

15. The electronic card as claimed in claim 13, wherein said processor is configured to obtain an identifier of a provider of the application to be loaded and wherein said authorization takes into account said identifier of the provider.

16. The electronic card as claimed in claim 15, said processor being configured to decline loading of the application on the basis of said identifier of the provider of the application to be loaded and of a user identifier of said security element.

17. A non-transitory computer-readable medium comprising instructions stored thereon, which when executed by a processor of a security element, which is able to communicate with an application loading server, configure the security element to implement a method comprising:
storing a list of at least one category of authorized application in association with the secure element, wherein at least one of the at least one category of authorized application is identified by a category identifier that is used by more than one application provider; and
authorizing loading of an application onto said security element on the basis of a match between a category of said application to be loaded and at least one category in the stored list.

* * * * *